Sept. 27, 1932.  P. DALTON  1,879,116
CALCULATING GONIOMETER
Filed May 2, 1929   3 Sheets-Sheet 1
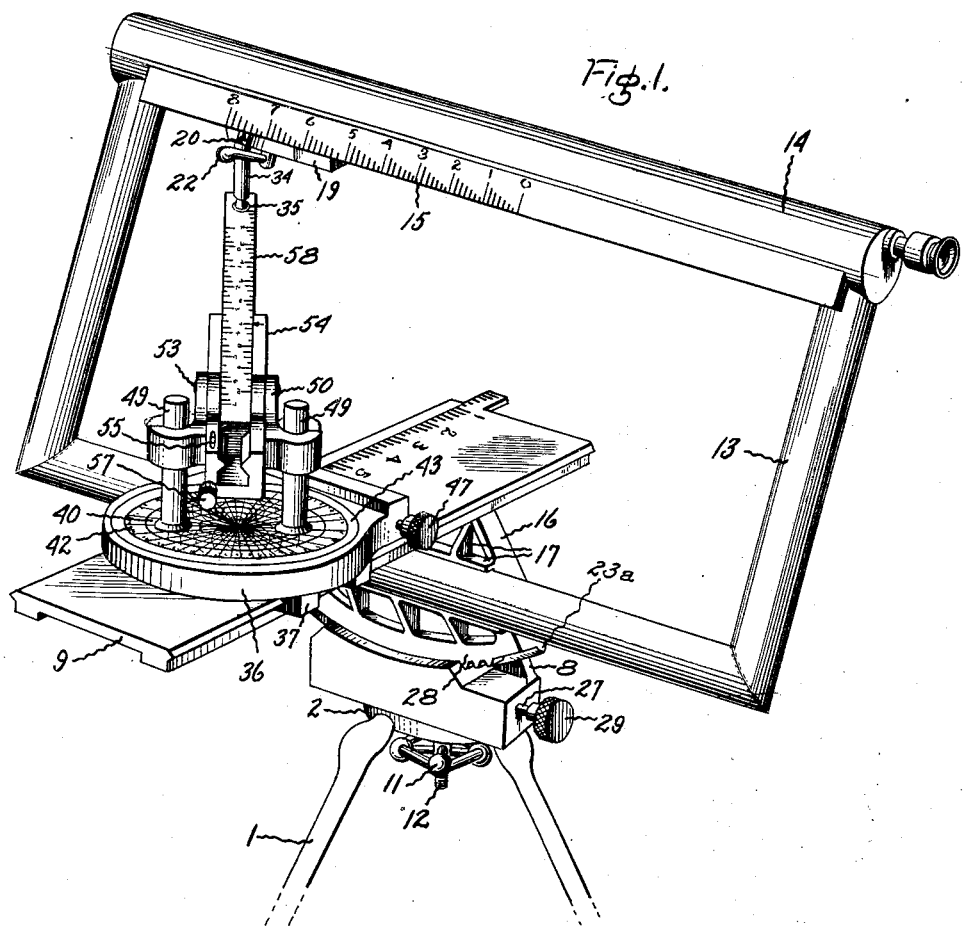
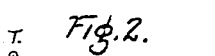
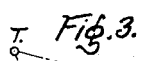
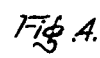
INVENTOR:
PHILIP DALTON,
by Irving H. Marshman
His ATTORNEY.

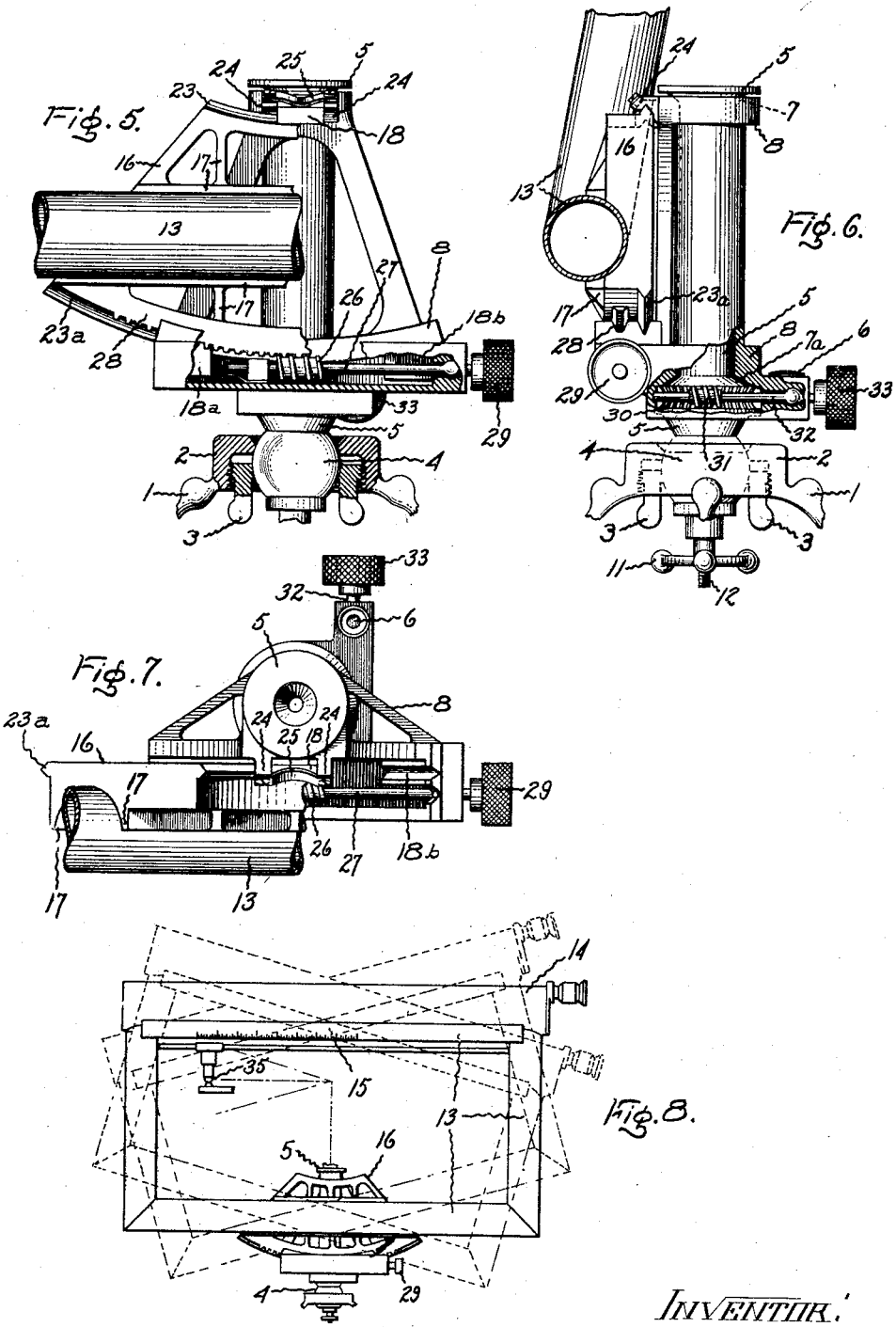

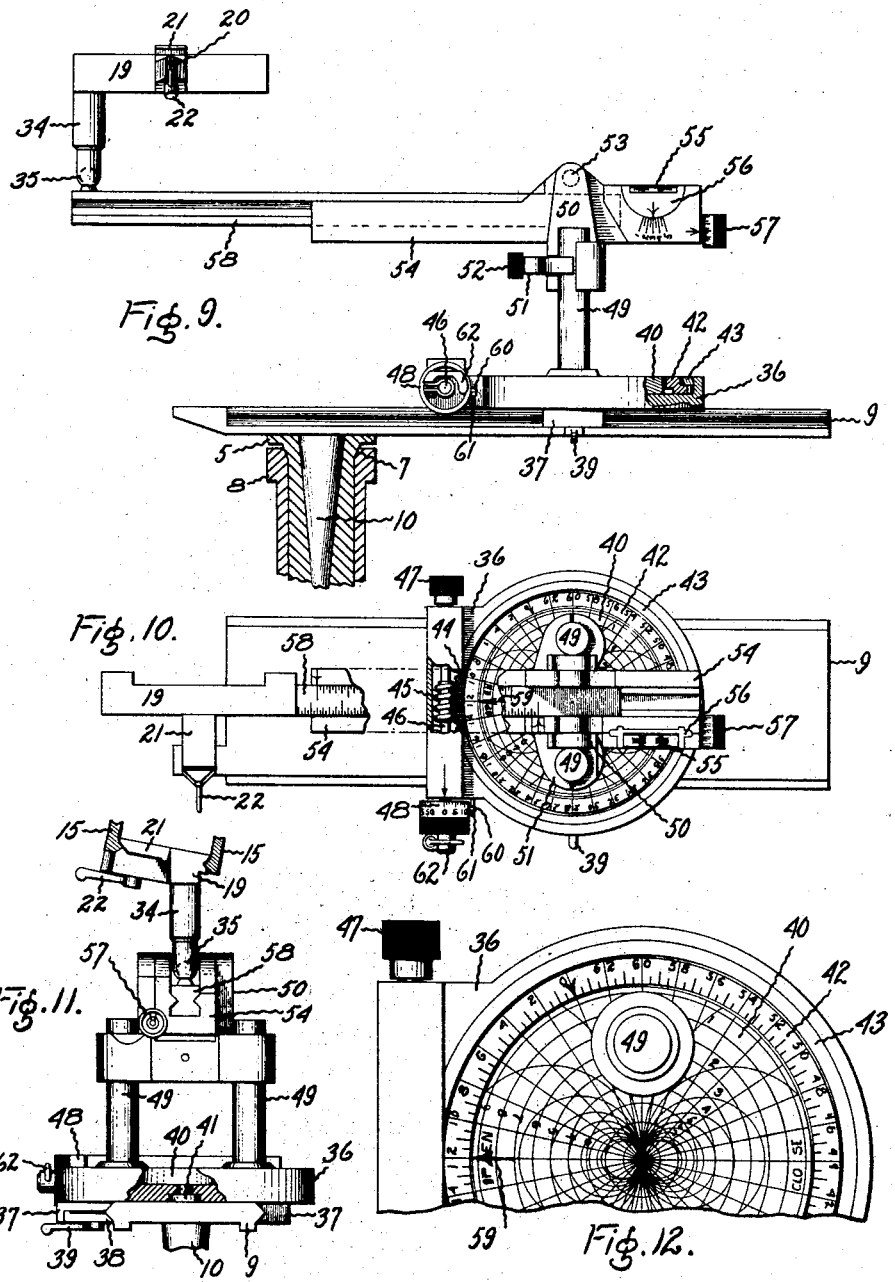

Patented Sept. 27, 1932

1,879,116

UNITED STATES PATENT OFFICE

PHILIP DALTON, OF SCHENECTADY, NEW YORK

CALCULATING GONIOMETER

Application filed May 2, 1929. Serial No. 359,815.

My invention relates to instruments for solving geometric and goniometric problems and more particularly to instruments for solving three dimensional topographometric problems.

Most artillery firing is done from a defiladed battery position from which the target is not directly observable, and because of this, the sighting device on the gun must be trained on an aiming point that is observable from the battery position. This method of artillery firing is known as "indirect laying".

In the carrying out of artillery firing by the method of "indirect laying", the four elements of firing data, deflection, deflection difference, angle of site (elevation), and range, must be calculated from observations made with a goniometer and a range finder at an observation post remote from the battery position. At present, these data are usually calculated mentally.

In the preparation and conduct of fire when the observation post is at a considerable distance from the battery position, as for example in the case of "unilateral observation", or even in the simpler case of "axial observation", mental calculations made under the stresses of an artillery command are often erroneous due for example to such errors as subtraction when addition was intended. Accordingly, an object of my invention is the provision of an infallible calculating instrument with which the four elements of firing data may be automatically obtained while making the necessary goniometric observations.

A more specific object of my invention is the provision of an instrument for calculating the above-mentioned elements of firing data, in which a sighting device is incorporated in a calculating mechanism and in which the elements of firing data are automatically calculated by the instrument while the observations are being made with the sighting device.

I am aware that there are known devices for solving problems in plane geometry and for calculating one or two elements of the artillery firing data mentioned above. But I know of no previous device of this nature for solving geometric problems in three dimensions or for automatically calculating all four or even three of the geometric elements of firing data. Moreover, some of the known devices for solving problems in plane geometry have serious mechanical limitations in that mutual interference of their parts prohibits their functioning in certain positions and also prohibits the rapid adjustment of their parts from certain positions to certain other positions.

It is, therefore, a still further object of my invention to provide a calculating mechanism which is universally operable in all positions for solving problems in plane geometry and also for solving three dimensional geometric problems within preestablished limits of the third dimension.

In carrying my invention into effect in one form thereof, I provide three arm members connected together by three universal joints, two of which are slidably mounted on two of the arms respectively, to permit the adjustment of the centers of rotations of two of the universal joints to desired positions of azimuth, distance, and elevation with respect to the center of rotations of the third universal joint.

For a better and more complete understanding of the invention, reference should now be made to the following specification and to the accompanying drawings in which, Fig. 1 is a perspective view of a calculating instrument embodying the invention; Figs. 2, 3 and 4 are diagrammatic plan views illustrating a typical artillery problem and the manner in which the instrument is operated to calculate the four elements of firing data; Figs. 5, 6 and 7 are respectively side, rear, and plan views of the telescope cradle, cradle support, and main supporting spindle; Fig. 8 is a diagrammatic side view illustrating the function of the telescope cradle; Figs. 9, 10 and 11 are respectively, side, plan and rear views of the protractor mechanism and its supporting arm; and Fig. 12 is a detailed plan view of the graduated protractor azimuth ring and the protractor index plate with its deflection difference chart.

Referring now to the drawings, the instrument proper is supported by a tripod 1, the head 2 of which is a socket having the shape of an inverted cup. The inner wall of the socket 2 is threaded to receive the wing nut 3 which, when screwed into the socket 2 serves to clamp the head of the tripod to the ball 4 at the lower end of the main supporting spindle 5. A spherical leveling bubble 6, suitably disposed upon the instrument assists in adjusting the main supporting spindle in a vertical position prior to clamping the ball 4 of the spindle in the socket 2.

The remainder of the instrument may be considered as composed of two parts; the line of sighting mechanism, and the protractor mechanism.

The line of sighting mechanism is supported upon the main supporting spindle 5 by the conical bearing surfaces 7, 7a located between the spindle 5 and the cradle support 8.

The protractor mechanism is supported by a supporting arm 9 which in turn is supported by the spindle 5 by means of the flat bearing surface between the top of spindle 5 and the bottom of the supporting arm. As is clearly shown in Fig. 9 the spindle 5 is not solid, but is hollowed to receive the conical spindle 10, with which protractor supporting arm 9 is provided, to permit of rotation of the latter in a horizontal plane about the vertical axis of spindle 5. Thus it will be clear, that the protractor mechanism and the line of sighting mechanism which is supported by the cradle support 8 are independently rotatable in azimuth about the axis of main supporting spindle 5.

Once rotated to any desired position of azimuth, the protractor supporting arm 9 may be clamped and retained in that position by the hand nut 11 on the threaded stud 12, which as will be observed in Figs. 5, 6 and 11 is the lower extremity of conical spindle 10.

The line of sighting mechanism consists of a supporting framework 13 for supporting a telescope 14. Although the framework 13 is shown as being of rectangular form, persons skilled in the art will understand that various other forms of supports, such as a U-shaped or a quadrant shaped support might also be employed. The line of sighting mechanism is provided with a slide 15. It is preferable that the slide 15 and telescope 14 should be integral with the supporting frame 13 as shown. The supporting frame 13 is attached to a telescope cradle 16 by means of the rib and flange construction 17.

As is most clearly shown in Figs. 5, 6 and 7, the cradle support 8 is provided with three V bearing blocks 18, 18a, 18b into which are fitted the two concentric circular arc-shaped V bearing edges 23, 23a with which telescope cradle 16 is provided, to permit of a rotary movement of the telescope 14 and line of sighting slide 15 about a horizontal axis displaced upwardly from the V bearings themselves. The lower two bearing blocks 18a, 18b are rigidly attached to the cradle support 8, and the upper bearing block 18 is slidable vertically in the vertically disposed guideway 24. The bearing system is kept tight by a leaf spring 25, which as most clearly shown in Figs. 5 and 7 acts at an angle of 45° with the vertical to hold the bearing block 18 down upon V bearing edge 23 and tightly against the body of cradle support 8. The telescope cradle 16 and the telescope 14 supported thereby are rotatable in these bearings about the horizontal axis by means of the elevation worm 26, spindle 27 housed in cradle support 8, worm wheel segment 28 on cradle 16, and the manually operable elevation knob 29. Cradle support 8, and consequently cradle 16, telescope 14, and slide 15 are rotatable in azimuth about the vertical axis of main supporting spindle 5 by worm wheel 30 on spindle 5, azimuth worm 31, spindle 32 housed in cradle support 8, and manually operated azimuth knob 33.

By adjusting the two lower bearing blocks 18a, 18b, the horizontal axis of rotation of telescope cradle 16 can be made to intersect the vertical axis of rotation of the cradle support 8, at a point within the opening of framework 13 as illustrated in Fig. 8. It will thus be clear at this point that the bearings between spindle 5 and cradle support 8, and between cradle support 8 and cradle 16 form a universal joint having a center of rotations remote from the bearings themselves, and that as a consequence of being supported in cradle 16, telescope 14 and line of sighting slide 15 are universally movable about this center of rotations and are non-radial with respect thereto. This is an important feature of my invention and should be borne in mind for a proper appreciation of the description which follows.

A slider 19 is arranged to run on the inwardly disposed V-shaped bearing surfaces with which line of sighting slide 15 is provided (see Fig. 11). Slider 19 is provided with an index arrow 20 arranged to register with the scale on slide 15. The slider 19 may be clamped tightly in any desired position on slide 15 by means of clamping dog 21 and clamping lever 22.

A downwardly projecting arm 34 on slider 19 is provided as its lower extremity with a socket into which is fitted the ball member of a ball and socket universal joint 35. The arm 34 is so positioned on slider 19 that the center of rotations of ball and socket joint 35 can be adjusted to coincide with the fixed center of rotations of the line of sighting mechanism, when the index arrow 20 coincides with the zero graduation of the scale on line of sighting slide 15. The V bearing edges of slide 15 and the optical axis of telescope 14 are made parallel with each other.

The ability to superpose the center of rotations of universal joint 35 upon the center of rotations of the telescope and slider 15, or at least to move these two centers into very close proximity with each other, is also an important feature of my invention. When the slider 19 is displaced along slide 15, the center of universal joint 35 is displaced from the center of rotations of the sighting mechanism in a direction parallel with the optical axis of telescope 14 a distance indicated by the position of the index arrow 20 with respect to the graduated scale. By the aid of a range finder, or by estimation of distances, the relative position in azimuth, distance, and elevation of any point observable with the telescope with respect to the center of rotations of the telescope, can be represented to small scale by the position of the center of universal joint 35. That is to say, that if the distance between the center of rotations of the telescope and a distant point is known, the telescope may be sighted on the distant point and the slider 19 displaced along slide 15 a distance from the zero of slide 15 corresponding to scale to the distance between the center of rotations of the telescope and the distant point. The center of universal joint 35 will likewise be displaced from the center of rotations of the telescope an equal distance. Thus its center will lie on the line joining the center of rotations of the telescope with the distant point, and its position with respect to the center of rotations of the telescope on that line will correspond to scale in distance and elevation with the position of the distant point with respect thereto. Therefore, it will be clear, that if the distant point is close to the center of rotations of the telescope, it is important that the centers of rotations of the telescope and the universal joint 35 should be superimposable or movable into very close proximity with each other. All this should be borne in mind for a proper understanding of that which is to follow.

All this small scale reproduction of distant positions by universal joint 35 takes place within the confines of the open framework 13 of the line of sighting mechanism and it is within this "free space" that the protractor mechanism is mounted and functions for measuring the angular and distance relations between distant points as reproduced by the ball and socket 35.

The construction of the protractor mechanism will best be understood by referring to Figs. 9, 10, 11, and 12.

A micrometer housing 36 which also serves as a bedplate for the protractor is provided with V bearing blocks 37 to permit of its displacement along the protractor supporting arm 9 and may be secured in any desired position on the supporting arm by means of clamping dog 38 and lever 39. An index plate 40 is freely rotatable on the bedplate about the axis of a short vertical spindle 41. A graduated azimuth circle or ring 42 is held in place by a retaining ring 43, but may be rotated in the housing 36 about the axis of spindle 41 by the attached worm wheel 44, micrometer worm 45, spindle 46, and manually operable knobs 47 and 48.

Two vertical posts 49 are fixed to the freely rotatable index plate 40. A U bracket 50 is provided with two vertical holes into which the posts 49 are fitted. The bracket may be moved upwardly or downwardly upon these posts as desired, and is arranged to be secured in a desired position thereon by means of clamping dog 51 and manually operable knob 52. Bracket 50 is provided with horizontal bearings in which the raised horizontal trunnions 53 of protractor arm 54 are journaled to permit of rotation of arm 54 about a horizontal axis.

The angle of elevation that the protractor arm 54 makes with the horizontal may be determined by the elevation bubble 55 which is preferably located at one extremity of arm 54. The bubble 55 is rotatable in its vertical semi-circular worm wheel support or carriage 56 by the elevation micrometer knob 57.

A graduated extensible member 58 is freely slidable on the inwardly disposed V bearing surfaces in the arm 54 and its extremity carries the ball of ball and socket joint 35, by which the protractor arm is connected with the slider 19 on line of sighting slide 15.

The vertical axis of spindle 41 and the horizontal axis of trunnions 53 intersect each other at a point between the laterals of the U of the U-shaped bearing bracket 50. It will therefore be clear that the bedplate and index plate of the protractor, relatively movable about a vertical axis, and the horizontal trunnions 53 and U bearing bracket 50 form a universal joint having a center of rotations remote from the bearings comprising the joint, and that the protractor arm 54 is universally movable about this center. Hereinafter in this specification the center of rotations of this universal joint will be referred to as the center of the protractor mechanism.

It should also be noted here that the protractor arm 54 which connects the protractor mechanism just described, with universal joint 35 is non-radial with respect to the centers of rotations of both of these universal joints. This fact coupled with the fact that the protractor mechanism universal joint has remote bearings, permits their centers of rotations to be superimposed upon each other. As shown in Fig. 10, one of the two relatively movable members 54, 58 of the protractor arm is provided with a scale and the other with a cooperating index arrow. Preferably, this scale is so positioned that the two members will be at zero extension, i. e., the arrow will be opposite zero on the scale when the center of rotations of universal joint 35 coincides with the center of rotations of the protractor mechanism.

Thus by loosening clamping nut 11, lever 39, and knob 52 and by holding the protractor arm 54 at zero extension while the telescope 14 is sighted on a distant subject such for example as the directing piece of a battery the universal joint 35 and the center of rotations of the protractor mechanism (held coincident therewith) may be displaced from the center of rotation of the telescope to a position in distance and elevation corresponding to scale with the location in space of the gun with respect to the center of rotation of the telescope. The center of rotations of the protractor mechanism may then be fixed at this point by retightening the three clamps 11, 39 and 52 of the protractor supporting mechanism.

An arrow 59 on index plate 40 and the vertical axis of spindle 41 are always in a vertical plane (since a line and a point without a line determine a plane). Therefore, when protractor arm 54 and its extensible member 58 are rotated into subsequent positions by rotation of the telescope, the angular displacement between the arrow 59 and azimuth circle 42 will be a true measure of the rotation in azimuth of protractor arm 54 about the center of rotations of the protractor universal joint.

Likewise, the angles of elevation of the subsequent positions of the center of the ball and socket 35 with respect to the center of rotations of the protractor mechanism can be measured with the elevation micrometer knob 57, and the distances between these two centers can be measured by the graduations on the extensible member 58 and the indices on the protractor arm 54, because the line between the centers of the two universal joints is always parallel to the V-bearing surfaces of the member 58 and the arm 54.

The azimuth micrometer worm 45 is geared to the azimuth circle 42 to enable the zero mark on the latter to be rotated until it coincides with index arrow 59 on index plate 40. The worm spindle 46 is provided with two knobs, a small one 47 at one end of the spindle and a large one 48 at the other end. The small knob 47 serves to rotate the azimuth circle rapidly. The large knob 48 is mounted loosely about spindle 46, but may, by means of clamping lever 62, be clamped tightly on the spindle so as to turn with it. Micrometer knob 48 is provided with a graduated scale cooperating with an index arrow on the housing 36 and has a zero stop consisting of pin 60 on the knob and pin 61 on the housing. The purpose of the stop is to enable rapid setting of the knob at zero before clamping, and to prevent turning of the knob more than one revolution which corresponds to one graduation of the azimuth circle 42. Due to the zero stop, the micrometer knob 48 can turn only a little less than one revolution, so the micrometer worm and the graduations of knob are accordingly calibrated for that fraction of the revolution.

Persons skilled in this art will understand that if a battery of guns is to fire a parallel sheaf of fire upon a target by sighting the sights of all the guns of the battery on a common aiming point, a different deflection angle must be used for each gun. Referring to Fig. 4, the angle between the lines connecting gun G with target T and with aiming point A. P. is known as the "angle of deflection". It is the azimuth angle that must exist between the bore of each gun and the optical axis of its sighting device when the latter is sighted on the aiming point to enable the gun to fire on the target.

If the same angle of deflection were used by the gun $G^1$ and the remaining guns in the battery, their fire would not be parallel with the line of fire of gun G. Thus it is necessary to make a correction for each gun in the battery to insure parallel fire. As shown in Fig. 4 the correction for gun $G^1$ will be the parallax angle G, A. P., $G^1$, and this angle is known as the "deflection difference".

From the foregoing and by referring to Fig. 4 it will be clear that the deflection difference is a function involving the angle of deflection, the distance between the gun G and the aiming point A. P., and the distance between guns on a platoon front. This latter factor, i. e., the distance between guns on a platoon front may be assumed a constant value of twenty yards, and perpendicular to the line of fire.

A chart or graph of deflection differences may be engraved or suitably inscribed upon the index plate 40 of the protractor as shown in Figs. 10 and 12. The particular graph shown in these two figures is a polar-coordinate graph of deflection differences plotted between angles of deflection and gun to aiming point ranges, and is plotted for a parallel sheaf of fire. The radial lines on the chart represent angles of deflection; the concentric circles represent gun to aiming point ranges, and the tangential circles represent deflection differences.

In use the chart may be read by finding the deflection difference curve nearest to the intersection of that radial deflection line most nearly coincident with the zero graduation on the azimuth ring 42 and that concentric circle having the value nearest to the proper gun to aiming point range, as determined by the rest of the calculating mechanisms (which will be more fully explained hereinafter).

With the above understanding of the elements comprising an embodiment of my invention, the manner of their association with each other, and their functioning with respect to each other, the operation of the instrument in calculating the four elements of a typical artillery problem will readily be grasped and understood from the detailed description which follows.

The instrument is set up at an observation post preferably one from which the battery, the aiming point, and target are all observable such for example as the point O. P. in Figs. 2, 3 and 4, and is leveled by the spherical leveling bubble 6, after which the wing nut 3 is tightened to camp the ball 4 in socket 2. The center of rotations of the telescope thus becomes the point O. P.

The cross hairs of the telescope are then adjusted upon the sight of the directing piece of the battery (in this case gun G) by manipulating the azimuth knob 33 and elevation knob 29. Slider 19 is then moved out on line of sighting slide 15 until its index arrow 20 coincides with the graduation on the scale corresponding to the distance from the observation post O. P. to the gun G as determined by a range finder. Slider 19 is then clamped in place by clamping lever 22. The center of universal joint 35 will now be on the line joining O. P. with the gun G, and its position on that line with respect to O. P. will correspond to scale in distance and elevation with the position of the gun G with respect thereto.

The three supporting clamps 11, 39, and 52 will now be loosened, and the protractor mechanism moved toward the universal joint 35 until the graduated extensible member 58 is at zero extension and the center of rotations of the protractor mechanism is coincident with the center of universal joint 35, and the center of the protractor mechanism is fixed in this position by retightening the clamps 11, 39, and 52. Thus, the center of the protractor mechanism is on the line O. P.—G joining the center of rotations of the telescope O. P. with the gun G, and its position on that line with respect to O. P. corresponds to scale in distance and elevation with the position of gun G with respect thereto. This leaves the instrument in the position shown in Fig. 2.

The vertical cross hair of the telescope is next adjusted on the aiming point A. P. and slider 19 is moved out on line of sighting slide 15 until its index arrow 20 coincides with the graduation on the scale corresponding with the range finder distance from the observation post O. P. to the aiming point A. P., and is clamped in that position by clamping lever 22. The center of universal joint 35 is now on the line joining the center of rotations of the telescope O. P. with aiming point A. P. and its position on this line with respect to O. P. corresponds to scale with the position of A. P. with respect thereto. The instrument will now be in the position shown in Fig. 3 with the positions of the centers of the protractor mechanism and the universal joint 35 corresponding to scale to the positions of gun G and aiming point A. P., respectively, with respect to O. P. The extension of the extensible member 58 with respect to protractor arm 54 will then be a true measure to scale of the gun to aiming point range, i. e., the distance between the gun G and aiming point A. P. The graduations of the scale on extensible member 58 are to the same scale as those on line of sighting slide 15, and therefore the distance from the gun G to the aiming point A. P. may be read to scale by the scale on extensible member 58, and the cooperating index arrow on protractor arm 54. This reading should be made at this point in the operation and noted down, since it is one of the elements necessary in obtaining the deflection difference by means of the deflection difference chart at a later point in the operation.

The graduated micrometer knob 48 is next loosened by releasing clamping lever 62, and the azimuth ring 42 is then rotated by means of knob 47 until its zero graduation is coincident with the index arrow 59. Micrometer knob is then set at zero and clamped in place by clamping lever 62.

These adjustments leave the instrument in the position shown in Fig. 3 with the zero graduation of azimuth ring 42 in the vertical plane of line $g$—$ap$ which is parallel with the line G—AP because points $g$ and $ap$ are on lines O. P.—G and O. P.—A. P. respectively and are distant from O. P. in proportion to the lengths of those lines as determined by range finder and set by the scale on slide 15.

Lastly, the cross hairs of the telescope are adjusted on the target, and slider 19 is moved out on line of sighting slide 15 until the index arrow 20 coincides with the graduation on the scale corresponding with the distance from the observation post O. P. to the target T as determined by range finder. The instrument will now be in the position shown in Fig. 4 with the center of universal joint 35 lying on the line joining the center of rotations of the telescope O. P. with the target T. Its position in distance and elevation on this line with respect to the center of rotations O. P. of the telescope will correspond to scale with the position of the target T with respect thereto. The nearest graduation of azimuth ring 42 is adjusted until it coincides with index arrow 59 on index plate 40 by means of micrometer knob 48, and the angle of site (angle of elevation) bubble 55 is leveled by means of its micrometer knob 57.

The adjustments are now completed and the four elements of firing data may be read from the instrument. In Fig. 4, the positions of the center of protractor mechanism represented by the point $g$, and the center of universal joint 35 represented by the point to occupy positions in distance and elevation with respect to O. P. corresponding to scale with the positions of the gun G and target T with respect to O. P. and on the lines joining O. P. with G and T, respectively as before explained. Therefore, the triangle t—g—OP is similar to, and lies in the plane of triangle T—G—O. P., and accordingly the distance from the gun to the target will be represented to scale by the distance between the center of the protractor mechanism and the center of universal joint 35, and this distance may be measured by reading the extension of the extensible member 58 with respect to protractor arm 54. This reading gives the gun to target range.

Furthermore, the protractor arm 54 and its extensible member 58 are parallel with the line joining the gun with the target, i. e., line G—T, and therefore, the angle that arm 54 makes with the horizontal is equal to the angle that the line G—T makes with the horizontal, and this angle, which is the angle of site, may be measured by means of the bubble carriage 56 and leveling bubble 55, and its cooperating scale on protractor arm 54.

Since the triangles t—g—O. P. and O. P.—g—ap are similar to triangle T—G—OP and OP—G—AP, respectively, it will be clear that the azimuth angle t—g—ap is equal to the angle T—G—AP, the angle of deflection. It should also be clear that when the telescope is rotated from the position shown in Fig. 3 to the position shown in Fig. 4, the protractor arm 54 is rotated about the center of the protractor mechanism through the azimuth angle t—g—ap. Protractor arm 54 being attached to freely rotatable index plate 40, the vertical axis of rotation of which passes through the center of rotations of protractor arm 54, the rotation of the latter in azimuth from the position shown in Fig. 3 to the position shown in Fig. 4, will effect rotation of the index plate 40 of the protractor through the same azimuth angle, with respect to azimuth ring 42. Therefore, since the zero on azimuth ring 42 was set coincident with the index arrow 59 in the position of the instrument in Fig. 3, the graduation of the ring 42 coincident with the arrow 59 in the position of the instrument in Fig. 4 will be a true measure of the angle T—G—A. P., the angle of deflection.

The deflection difference may be read directly from the deflection difference chart as heretofore explained in this specification.

Without changing the adjustments made in Figs. 2 and 3, the adjustment in Fig. 4 may be changed to calculate the firing data for the preparation of fire on any number of subsequent targets simply by sighting on the new target adjusting the slider 19 for the new distance and reading the data from the instrument as already explained.

In the event that either the battery, the aiming point, or both battery and aiming point are not visible from the observation post, the adjustments made in Figs. 2 and 3 may be made by observation of "high bursts" fired at a stipulated range, elevation, and angle of deflection with the aiming point.

From the foregoing description, it will be seen that I have provided a calculating instrument that automatically calculates the four elements of typical gun fire problems in three dimensional space while the necessary goniometric observations are being made with the telescope. It will also be seen that there is no mutual interference between the parts of an instrument embodying this invention in any position thereof, nor in moving from any position to any other position. Thus, I have succeeded in eliminating "blind spots" and their disadvantages so fatal to an instrument of this kind.

It is not necessary that the particular kind of remote bearings described in connection with the telescope mechanism and the protractor mechanism be employed, since various types of remote bearings are available to workers skilled in this art.

Although in accordance with the provisions of the patent statutes I have described my invention as embodied in particular elements associated with each other in a particular manner, I would have it distinctly understood, that the apparatus and elements disclosed and described are merely illustrative and that the invention is not limited thereto since modifications, alterations, and equivalent mechanisms will readily suggest themselves to workers skilled in this art without departing from the true spirit of this invention or from the scope of the annexed claims.

What I claim as new and desire to secure by Letters Patent of the United States is:

1. A measuring device comprising a sighting device arranged for rotation in a given plane about a given axis, a protractor mechanism, and means comprising elements including an extensible member and two universal joints for connecting said telescope with said protractor.

2. In combination in a measuring instrument, three arms, three universal joints for connecting said arms to form a closed structure, and means including slidable connections between two of said universal joints and two of said arms for permitting adjustment of the centers of two of said universal joints to desired positions of azimuth, distance, and elevation with respect to the center of rotations of said third universal joint.

3. In a calculating goniometer, three arms, three universal joints for connecting said arms with each other, one of said universal joints being movably mounted on one of said arms, two of said universal joints having bearings remote from their center of rotations, and at least one of said arms being extensible.

4. In a measuring instrument, a universal joint having a remote center of rotations, an arm having two relatively movable members, said arm being supported by said universal joint non-radially with respect to said center, and means providing for the adjustment of said center and a point fixed with respect to one of said members to desired positions of azimuth, distance, and elevation with respect to a point in space.

5. In a calculating goniometer, an arm, bearings mounting said arm for universal movement about a fixed center of rotations, a second arm, bearings mounting said second arm for universal movement about an adjustable center of rotations; and a universal joint slidably mounted upon one of said arms for connecting said arms with each other, said bearings being remote from their centers of rotations, and at least one of said arms being extensible.

6. In a calculating instrument, the combination which comprises three arms and three universal joints for connecting said arms with each other respectively, one of said arms being universally movable about a fixed center of rotations, and one of said universal joints being provided with bearings remote from said center.

7. In a calculating goniometer three arms, at least three universal joints connecting said arms with each other to form a closed figure, two of said universal joints having bearings remote from their centers of rotations, means comprising slidable connections for two of said joints on three of said arms providing for the adjustment of the centers of rotations of two of said universal joints to desired positions of azimuth and distance with respect to the center of rotations of a third universal joint, and means for determining the distance between the centers of said two universal joints.

8. An instrument of the character described comprising in combination, a sighting device having a slider, means for mounting said telescope for universal movement, a protractor comprising a fixed member and a movable member, and an extensible arm having one of its extremities mounted for universal movement with respect to said fixed member and having the other of its extremities connected to said slider.

9. A measuring device comprising elements including a sighting device, a protractor having two relatively movable parts, a universal joint having bearings remote from their center of rotations for mounting said sighting device for universal movement about said center, supporting means for said protractor and said universal joint, and an extensible arm having two relatively movable members, one of said members being connected to said sighting device, and the other being connected to one of the parts of said protractor.

10. In combination in a measuring instrument, a sighting device, means mounting said sighting device for universal movement about a fixed point, said means including a bearing remote from its center of rotations, a universal joint slidably mounted on said sighting device, a protractor mechanism and an extensible arm having two members respectively connected to said universal joint and said protractor mechanism, whereby said protractor is operable in accordance with the rotation in azimuth of said extensible member to measure the deflection angle between the lines joining a point with two other points.

11. A calculating goniometer comprising in combination, a sighting device mounted for universal movement about a center of rotations, a supporting arm mounted for rotation about a vertical axis, a protractor comprising a relatively fixed and a relatively movable member, and an extensible member having one extremity connected to said sighting device and the opposite extremity connected to said supporting arm through a universal connection, said universal connection comprising said relatively fixed and said relatively movable members.

12. An instrument of the character described comprising elements including a telescope mounted for universal rotation about a fixed point, an extensible member connected with said telescope and operable thereby for indicating the distance between two points fixed in space and the angle of elevation between the line connecting said points, and the horizontal plane, and a protractor operable by said member to indicate the angle of deflection between said line, and a second line connecting one of said points with a third point.

13. In a calculating goniometer three arms, at least three universal joints connecting said arms with each other to form a closed figure, two of said universal joints having bearings remote from their centers of rotations, means comprising slidable connections for two of said joints on three of said arms providing for the adjustment of the centers of rotations of two of said universal joints to desired positions of azimuth and distance with respect to the center of rotations of said third universal joint, means for determining the distance between the centers of said two universal joints, and means comprising a protractor mechanism included in one of said two universal joints for measuring the azimuth angles through which the arm connecting said two universal joints is rotated.

14. In an instrument of the character described, an arm mounted for universal movement about a fixed center of rotations and means for orienting said arm into a desired position of azimuth and elevation, a second arm mounted for universal movement about an adjustable center of rotations, one at least of said arms being nonradial with respect to its center of rotation, bearings remote from their centers of rotations for supporting said arms, means providing for the adjustment of the center of rotations of said second arm to a desired point of azimuth, elevation, and distance relative to said first mentioned center of rotations, a universal joint slidably connecting both arms, means for measuring the distances of the center of said universal joint from said centers of rotations of said arms, means for measuring the elevation of the center of said universal joint with respect to one of said centers, and a deflection difference chart incorporated in the bearing system of said second arm.

15. In a calculating goniometer, an arm member, a universal joint having a bearing system remote from its center of rotations for mounting said arm for universal movement about said center, a second arm connected to said universal joint, a second universal joint slidably mounted on one of said arms, a third universal joint slidably mounted on the other of said arms and provided with bearings remote from its center of rotations, a third arm comprising two relatively movable members respectively connected to said second and third universal joints, and means providing for the adjustment of the centers of rotations of said second and third universal joints to desired positions of azimuth, distance, and elevation with respect to said first center, two at least of said arms being non-radial with respect to all of said centers.

16. In a calculating device of the character described, three arms, three universal connections for connecting said arms with each other, two of said universal joints being slidably mounted upon two of said arms respectively, the third arm comprising two relatively movable members, means providing for the adjustment of the centers of rotations of two of said universal joints to positions of azimuth, distance, and elevation with respect to the centers of rotations of the remaining universal joint, and means for measuring the distance and elevation of the center of rotations of one of said two universal joints with respect to the center of rotations of the other of said two universal joints.

17. In combination in a calculating device of the character described, an arm member, a universal joint having bearing surfaces remote from its center of rotations mounting said arm for universal movement about said center, a second arm member comprising two relatively movable members, a second universal joint slidably mounted on said first arm for slidably connecting one of said relatively movable members with said first arm, a third arm connected to said first universal joint, and a third universal joint slidably mounted upon said third arm for slidably connecting the other of said two relatively movable members with said third arm; said second arm being non-radial with respect to the centers of rotations of said second and third universal joints, and said third universal joint having bearings remote from their center of rotations.

18. A telescope mounted for universal movement about a center of rotations, a supporting member arranged for rotation about a vertical axis intersecting said center, an extensible member provided with a universal joint at one extremity, said universal joint being slidably attached to said supporting member to permit displacement of said extremity an amount from said center corresponding with the length of one side of a triangle when said telescope is sighted along said side, means for connecting the opposite extremity of said extensible member with said telescope comprising a universal joint slidably mounted upon said telescope to permit the displacement of said opposite extremity an amount from said center corresponding to the length of a second side of said triangle when said telescope is sighted along said second side, whereby the distance between said extremities corresponds with the length of the third side of said triangle.

19. In a calculating device, a telescope mounted for universal movement about a fixed center of rotations and adapted to be successively sighted along the lines joining an observation point with a gun, an aiming point, and a target respectively, an extensible member having one extremity mounted for universal movement about a second fixed point, the opposite extremity being slidably and universally connected with said telescope, a protractor operable by movement of said telescope and said member for indicating the angle of deflection of the lines joining the gun with the aiming point and with the target, respectively, a graduated scale on said extensible member for indicating the distance between said gun and said target, means mounted upon said member for indicating the angle of site of the line joining the gun and the target, and a chart upon said protractor for indicating the deflection difference.

20. A calculating device comprising a sighting member mounted for universal movement about a fixed center of rotations, a supporting arm mounted for rotation about a vertical axis passing through said center, an extensible arm comprising two relatively movable members, a universal joint for connecting one of said members with said sighting member, a second universal joint for connecting the other of said members with said supporting arm, said sighting member and said extensible arm being provided with scales and said universal joints being movably mounted upon said sighting device and said supporting arm respectively whereby the displacements of the centers of said universal joints from said center of rotations and their included angle may be made to simulate the two known sides and the included angle of a triangle, and whereby the displacement of the elements of said extensible arm with respect to each other simulates the third side of said triangle.

21. A measuring device comprising a sighting device arranged for rotation in a given plane about a given axis, a protractor mechanism, said protractor having a chart provided with a plurality of radial lines representing angles of deflection, a plurality of concentric circles representing gun to aiming point ranges, and a plurality of tangential circles representing deflection differences, and means comprising elements including an extensible member and two universal joints for connecting said telescope with said protractor.

22. An instrument of the character described comprising in combination, a sighting device having a slider, means for mounting said telescope for universal movement, a protractor comprising a fixed member and a movable member, a chart provided with a plurality of radial lines representing values of angle between a line and a second line intersecting said first line at a given point, a plurality of concentric circles representing distances on said second line from said given point, a plurality of tangential circles representing values of parallax angles between said second line and a third line forming a point on said second line with a point remote from said given point, a support, for said fixed member, an index on said support cooperating with said radial lines, and an extensible arm having one of its extremities mounted for universal movement with respect to said fixed member and having the other of its extremities connected to said slider.

In witness whereof, I have hereunto set my hand this 29th day of April, 1929.

PHILIP DALTON.